United States Patent [19]

Iwai et al.

[11] Patent Number: 5,031,121
[45] Date of Patent: Jul. 9, 1991

[54] SYSTEM FOR AUTOMATICALLY PROCESSING A DOCUMENT INCLUDING TEXT AND ASSOCIATED IMAGE INFORMATION

[75] Inventors: Isamu Iwai; Miwako Doi, both of Kawasaki; Mika Fukui, Yokohama, all of Japan

[73] Assignee: Kabushiki Kaisha Toshiba, Kawasaki, Japan

[21] Appl. No.: 501,961

[22] Filed: Mar. 29, 1990

Related U.S. Application Data

[63] Continuation of Ser. No. 376,212, Jul. 5, 1989, abandoned, which is a continuation of Ser. No. 175,272, Mar. 30, 1988, abandoned.

[30] Foreign Application Priority Data

Mar. 31, 1987 [JP] Japan .................................. 62-78503

[51] Int. Cl.$^5$ ............................................. B06F 15/20
[52] U.S. Cl. .................................................... 364/523
[58] Field of Search ............... 364/518, 521, 522, 523; 340/723, 724; 382/41

[56] References Cited

U.S. PATENT DOCUMENTS 4,649,513 3/1987 Martin et al. ...................... 364/900
4,665,555 5/1987 Alker et al. ........................ 382/41
4,737,923 4/1988 Matsuzaki et al. ................ 364/519
4,782,463 11/1988 Sanders et al. ................ 364/300 X

FOREIGN PATENT DOCUMENTS 61-21570 10/1984 Japan .

OTHER PUBLICATIONS

Systems-Computers-Controls, vol. 12, No. 1, Jan./Feb. 1981, pp. 75-83, Silver Spring, Md., U.S.; T. Teranishi et al., "An Alphanumeric Text Editor with Graphic Editing Functions", §3.1; §4.2.2; FIG. 4.
Patent Abstracts of Japan, vol. 8, No. 192 (P-298) [1629], Sep. 4, 1984; & JP-A-59 79 342 (Nippon Denshin Denwa Kosha) 08-05-1984.

Primary Examiner—Heather R. Herndon
Attorney, Agent, or Firm—Oblon, Spivak, McClelland, Maier & Neustadt

[57] ABSTRACT

A document processing system includes an input section, a memory section, a text analyzing section, an image identifying section, an image size identifying section, a layout processing section, and an output section. Document data is constituted by text data and image data. The test data includes key information corresponding to the image data, and the image data is laid out in the document data. The text data and image data input through the input section are stored in the memory section. The text analyzing section identifies a position in the document data at which the image data is to be laid out, based on a position of key information in the text data. The image identifying section identifies image data corresponding to the key information. The image size identifying section identifies an image size of the image data identified by the image identifying section. The layout processing section lays out the identified image data at the identified image layout position in accordance with a predetermined layout rule.

16 Claims, 13 Drawing Sheets

| CATEGORY | ITEM |
|---|---|
| IMAGE CLASSIFICATION WORDS | Fig.<br>Table<br>Figure<br>⋮ |
| ALPHANUMERIC EXPRESSIONS | 1,2,3,------<br>①,②,③,------<br>I, II, III,------<br>A, B, C,------<br>⋮ |
| ADDITIONAL WORDS | No.<br>#<br>⋮ |

SYSTEM FOR AUTOMATICALLY PROCESSING A DOCUMENT INCLUDING TEXT AND ASSOCIATED IMAGE INFORMATION

This application is a continuation of application Ser. No. 97/376,212, field on Jul. 5, 1989, now abandoned, which is a continuation of application Ser. No. 97.175,272, filed on Mar. 30, 1988, now abandoned.

BACKGROUND OF THE INVENTION

1. Field of the Invention

The present invention relates to a document processing system which can automatically lay out image data such as figures, tables, and the like at appropriate positions in document data.

2. Description of the Related Art

In a conventional document processing system such as a wordprocessor, when image data such as figures and/or tables is laid out and embedded in a document created by the system, for example, a blank space is inserted in text data constituting a document, and image data of a figure and/or table is attached to the space. With this method, however, each time document data is edited later, the layout operation must be performed.

A function of setting a blank region in document data, e.g., a blank-open function or a region designation function, is provided to a wordprocessor. With this function, the image region is permanently laid out to a specific portion in a specific page. However, in this method, when document data is edited after the image region is laid out, a reference portion of a figure and/or table in text data is considerably separated from the fixed image region in a page, and the correspondence therebetween cannot be easily grasped. Such a case occurs when document data before the reference portion of the figure and/or table is greatly increased or decreased.

In this manner, when a blank space is formed at a given position on a page, if document data is edited thereafter, the position or size of the space in text data must be changed.

In contrast to this, blank lines are inserted in text data to keep an image region in text data. In this case, if document data is edited, the blank space is moved together with the text data, and the reference portion of a figure and/or table in document data can be prevented from being separated from a layout position of the figure and/or table. In this case, however, if these blank lines extend across two pages, the image region also extends across two pages, and the positions of the blank lines must be changed.

When a document is created using a wordprocessor, image data of an existing figure and/or table is often merged in document data. In this case, the size of image data is checked beforehand, and a space corresponding to the image size must be inserted in the document data, resulting in very cumbersome processing. If the size of the image data is changed, the size of the space in the document data must be changed.

In the conventional system as described above, (1) if an image region is permanently set at a position in a given page of document data, the relation between a text and a figure and/or table is often changed by editing of document data, and a cumbersome operation is required to obtain the correct relation. (2) If blank lines are inserted in text data, a set of blank lines for laying out a figure and/or table often extends across two pages by editing of document data, and a cumbersome operation is required to obtain the correct relation. (3) When a space for fetching image data is set in document data, the size of the image data must be checked, and this operation is also cumbersome. (4) When the size of image data is changed, the size of a space in document data must also be changed.

SUMMARY OF THE INVENTION

It is an object of the present invention to provide a document processing system which does not require, to an editor, i.e., an operator, a cumbersome operation when document data or image data is edited, and which can automatically and appropriately lay out an image region in document data.

A document processing system of the present invention comprises an input section for inputting text data and image data constituting document data, the text data including key information corresponding to the image data, and the image data being laid out in document data; a memory section for storing the text data and the image data input at the input section; a text analyzing section for specifying a position in the document data at which the image data is to be laid out, based on the position of key information in the text data in the document data; an image selecting section for specifying image data corresponding to the key information based on the key information with reference to image data stored in the memory section; an image size identifying section for identifying the size of the image region of the image data specified by the image selecting section; a layout processing section for laying out the image region of the selected image data in accordance with a predetermined layout rule; and an output section for outputting document data in which the image region is laid out by the layout processing section.

According to the present invention, a position at which image data in document is to be inserted is detected based on key information, such as a number or title of a figure and/or table, which corresponds to image data such as a specific figure and/or table, included in text data. Image data to be inserted is specified in accordance with the key information. When the insertion position and content of the image data are specified, an image region having a size designated by the image data is laid out in document data. In this case, an image data layout operation is performed in accordance with a predetermined layout rule, and layout of an image region extending across two pages or separation of an image reference portion in text data from the corresponding image data is avoided.

Therefore, according to the present invention, when document data, i.e., text data and image data, are edited later, the image data can be laid out to an optimal position without requiring any load to an editor.

According to the present invention, if text data and image data constituting document data are separately stored, key information for specifying image data and its insertion position is extracted from the text data. The image data can be specified and the size thereof can be identified based on this information. Thus, the image data can be laid out in document data without extending across two pages of document data. Therefore, a user (operator) need not perform an operation for forming a space corresponding to a region size of image data, and need not care if image data extends across two pages. Since automatic layout operation can be performed, a user's load can be greatly reduced, and effective document processing can be performed.

DETAILED DESCRIPTION OF THE PREFERRED EMBODIMENT

An embodiment of the present invention will be described with reference to the accompanying drawings.

Figure 1:
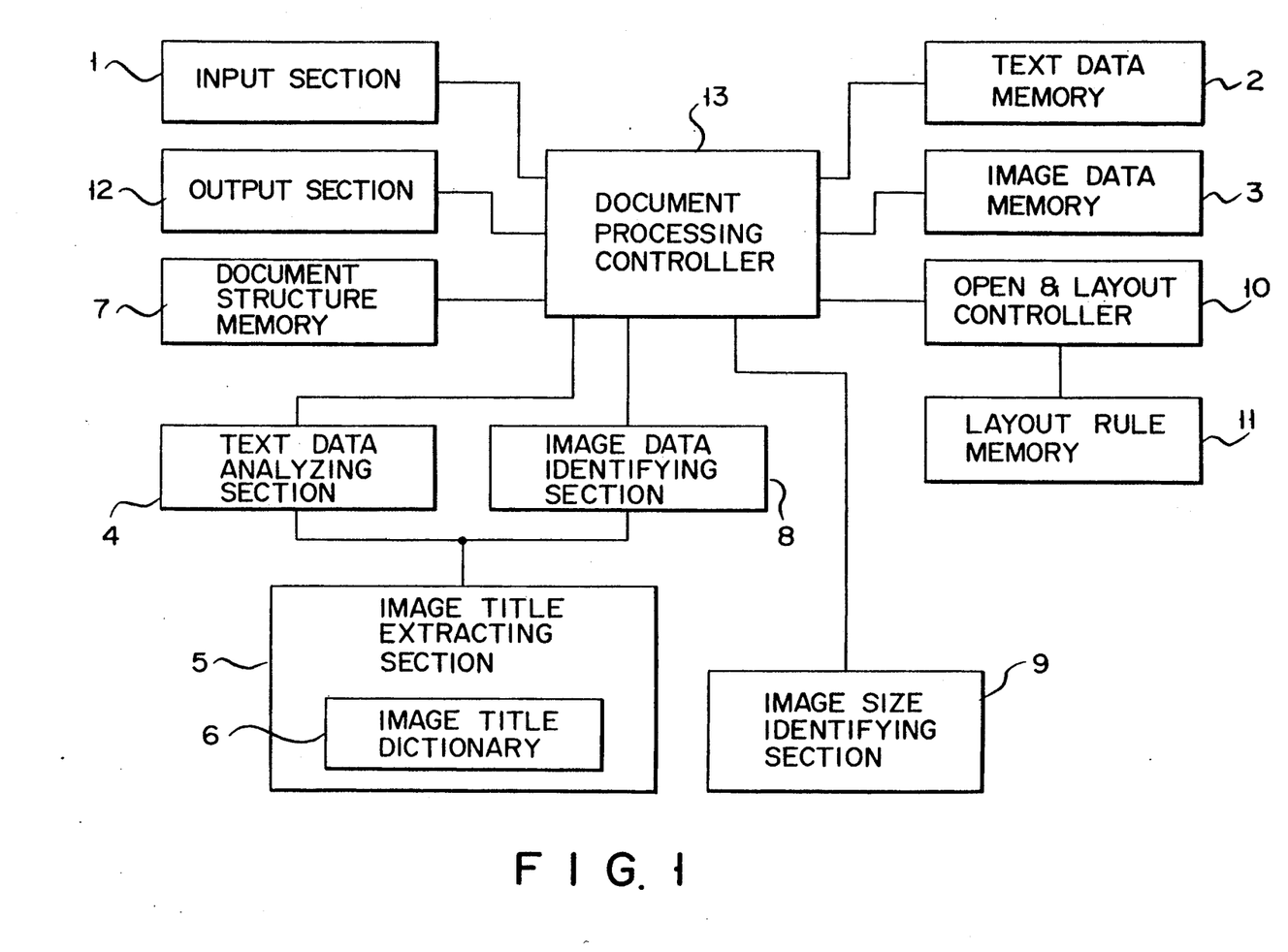
FIG. 1 is a block diagram showing a schematic arrangement of a document processing system according to an embodiment, of the present invention.

FIG. 1 is a block diagram showing a schematic arrangement of a document processing system according to an embodiment of the present invention.

Input section 1 is used for inputting text data constituting a document, image data such as figures and/or tables, and commands for an edit operation. Text data memory 2 stores the text data input through input section 1. Image data memory 3 stores the image data input at input section 1. Text data analyzing section 4 analyzes the text data stored in text data memory 2 in units of, e.g., sentences to detect predetermined key information in the text data, thereby specifying a position of the key information as a position at which a figure and/or table is to be inserted. The key information is information for referring to or indicating a figure and/or table. Note that in this embodiment, a title of a figure or table, i.e., an image title is used as key information. The image title is extracted by image title extracting section 5 with reference to image title dictionary 6. Document structure memory 7 stores the text data analyzed by text data analyzing section 4 and the key information position obtained as a result of analysis. Image data identifying section 8 retrieves image data having the same image title as that extracted from the text data from image data memory 3, and identifies it. Image size identifying section 9 identifies the region size of the identified image data. Open & layout controller 10 performs layout-control of the image data having the identified size at a position corresponding to the key information position stored in document structure memory 7. The layout control is performed in accordance with an image layout rule stored in layout rule memory 11 while opening or developing text data in a page image. Output section 12 outputs the document data in which image data is laid out. Document processing controller 13 controls the operations of these sections.

Figure 2:
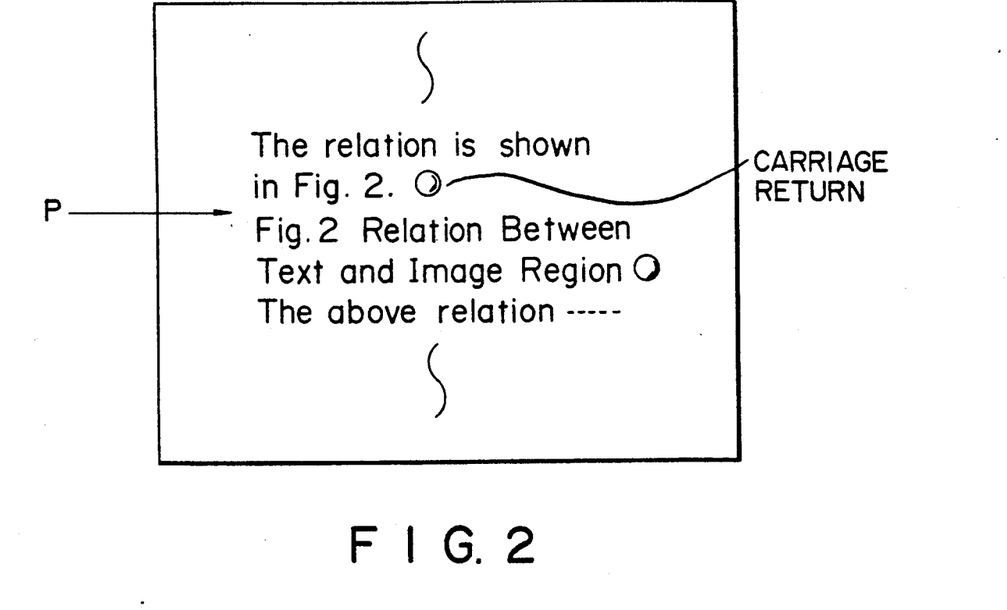
FIG. 2, is a view showing an example of text data input to the system shown in FIG. 1.
Figure 3:
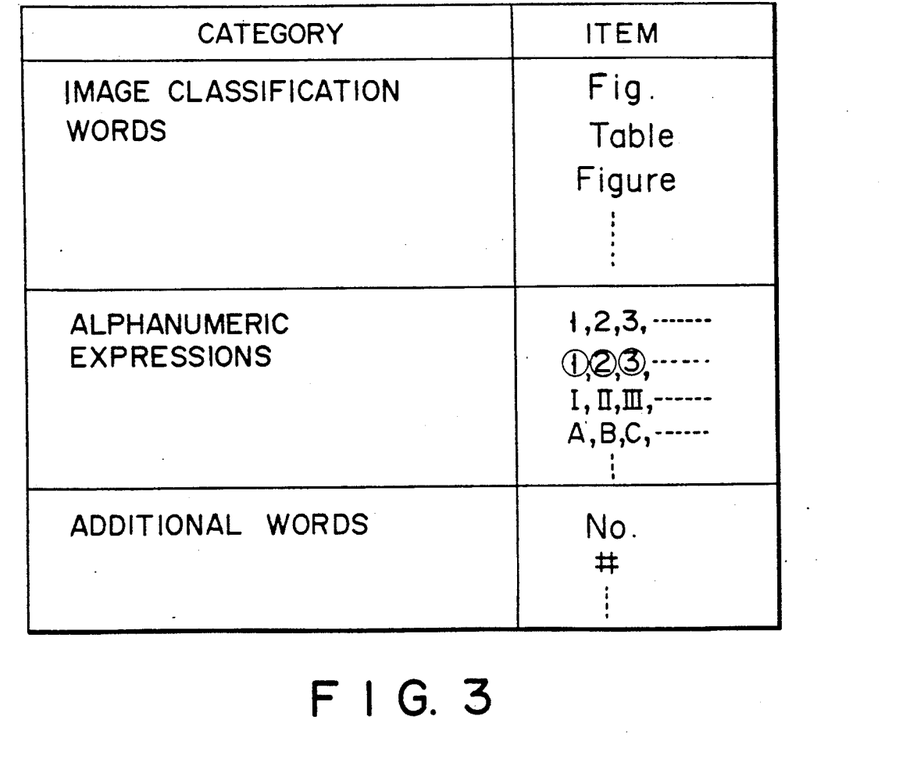
FIG. 3 is a view showing a storage content of image title dictionary in the system shown in FIG. 1.
Figure 4:
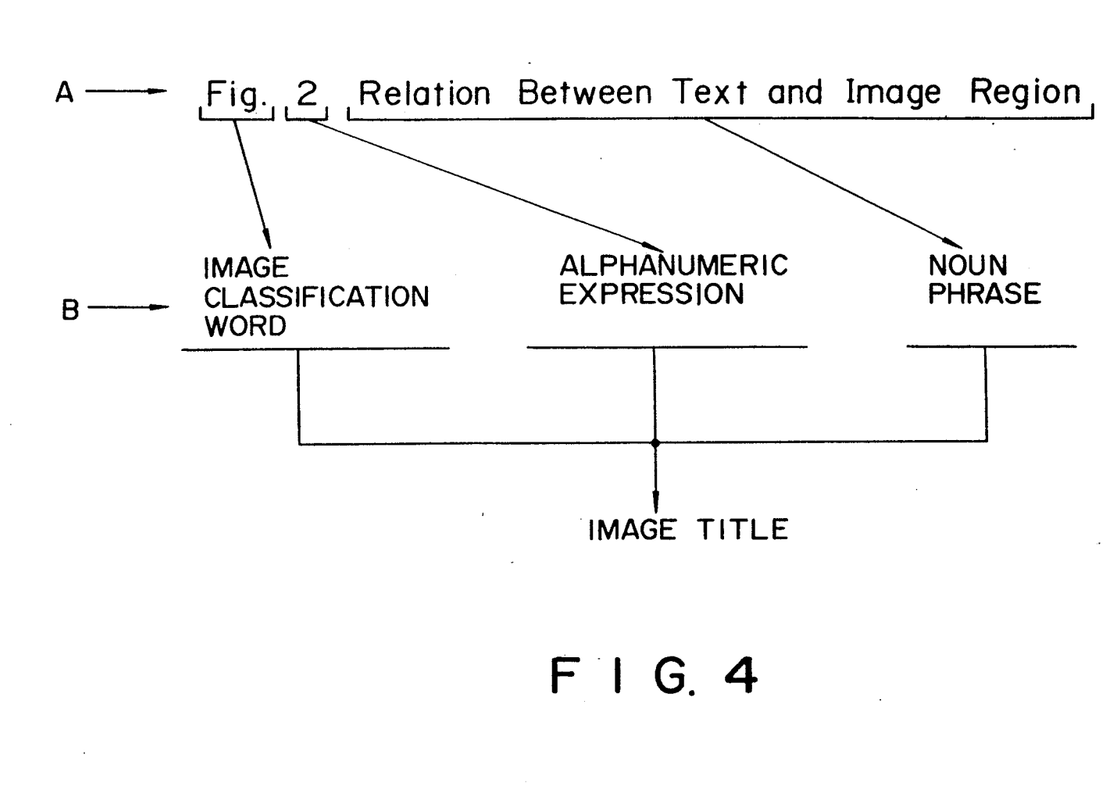
FIG. 4 is a view showing structural analysis of an image title in the system shown in FIG. 1.

Text data input from input section 1 is stored in text data memory 2 as original text data and is also sent to text data analyzing section 4 under the control of document processing controller 13. Text data analyzing section 4 analyzes input text data in units of sentences divided by a period or a return code, and extracts a sentence serving as an image title. For example, assuming that text data shown in FIG. 2 is input, matching processing between sentences and image title dictionary 6 shown in FIG. 3, i.e., processing for determining whether sentences match with the contents of image title dictionary 6, is performed. As a result, a sentence [FIG. 2 Relation Between Text and Image Region]in text data shown in FIG. 2 is analyzed into three categories, i.e., an image classification word, an alphanumeric expression, and a noun phrase, as indicated by A in FIG. 4. In some cases, an image title may include an additional word such as "No." in addition to the above-mentioned three categories like the content of image title dictionary shown in FIG. 3. A category pattern consisting of the categories is analyzed in accordance with an image title rule prestored in image title extracting section 5, and this sentence is analyzed to be an image title, as indicated by B in FIG. 4. The value of key information position indicated by, e.g., a sentence number of the sentence, and a structural attribute indicating the image title are stored in document structure memory 7. The image title rule is as follows.

Image Title Rule

[Rule 1]

Condition 1. A sentence is constituted in the order of an image classification word, an alphanumeric expression, and a noun phrase.

[Result]The sentence is an image title.

[Rule 2]

Condition 1. A sentence is constituted in the order of an image classification word, an additional word, an alphanumeric expression, and a noun phrase.

[Result]The sentence is an image title.

[Rule 3]

Condition 1. A sentence is constituted in the order of an additional word, an alphanumeric expression, an image classification word, and a noun phrase.

[Result]The sentence is an image title.

... (others)

Figure 5:
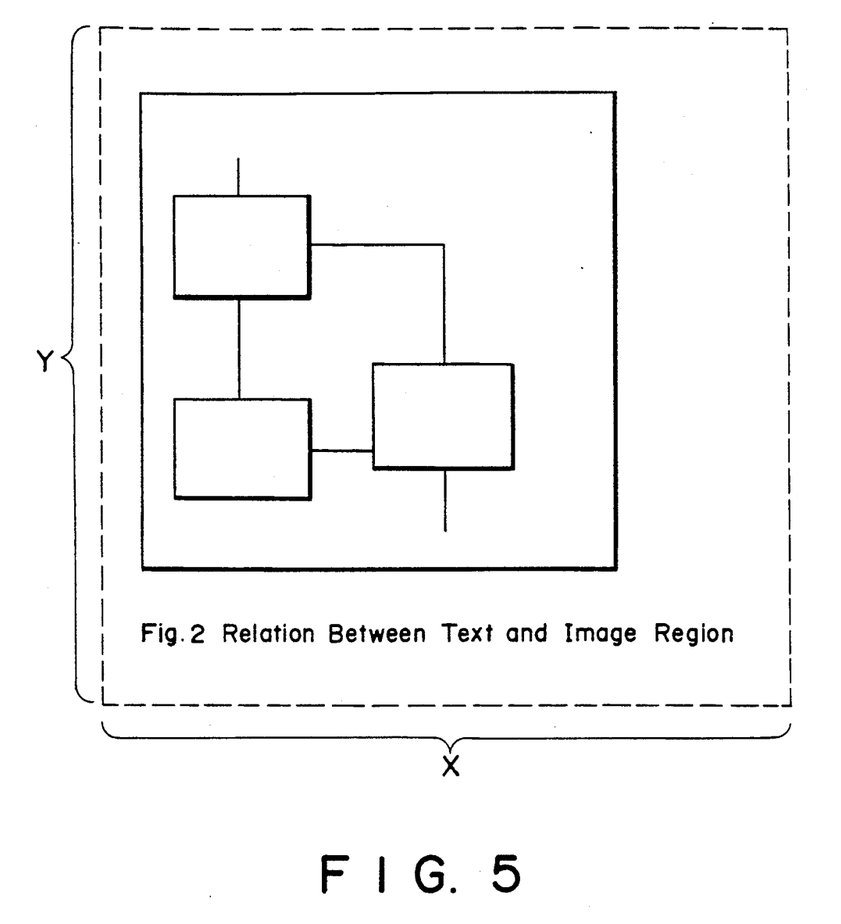
FIG. 5 is a view showing an example of image data input to the system shown in FIG. 1.
Figure 6:
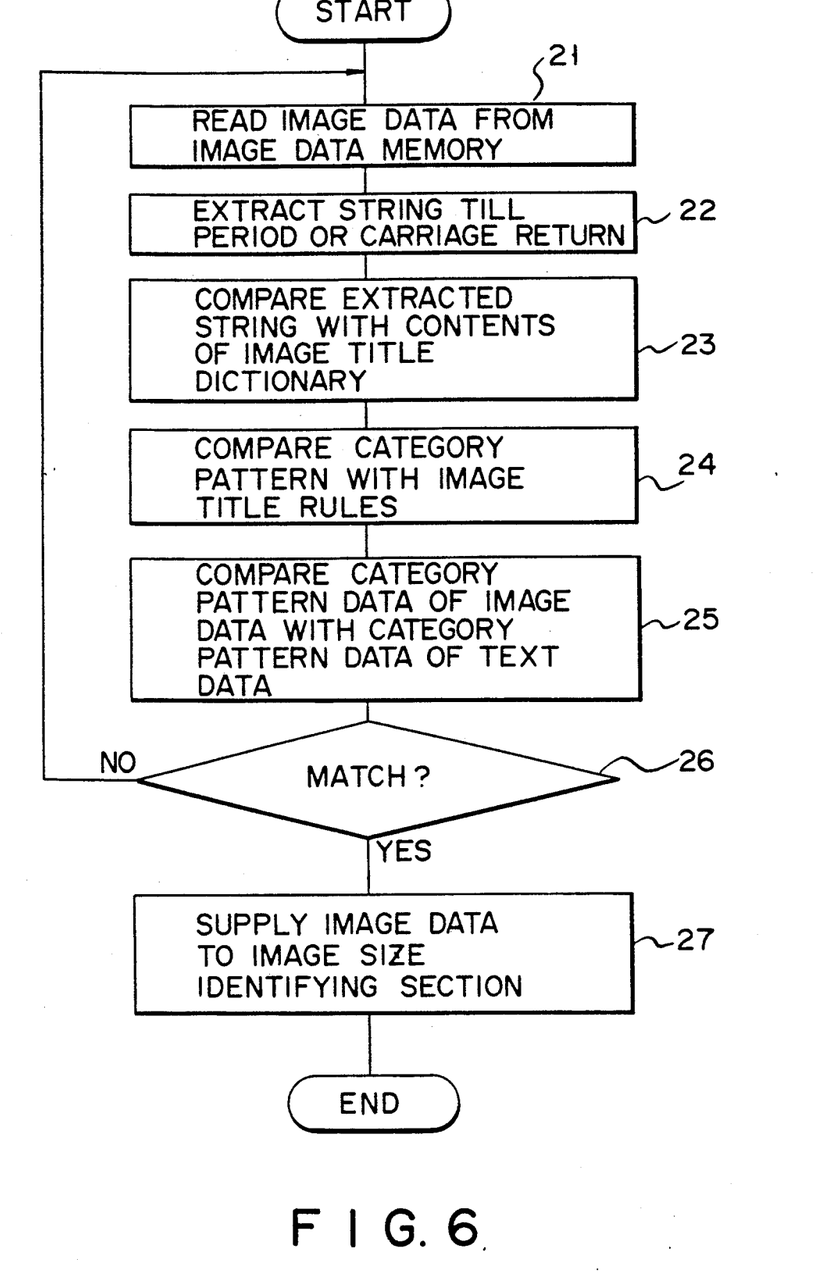
FIG. 6 is a flow chart showing image title analysis processing in the system shown in FIG. 1.

Image data identifying section 8 performs analysis of image data shown in FIG. 5 as in text data analyzing section 4. More specifically, section 8 extracts and identifies an image title in the image data. This identification process is performed in the same manner as in image title identification in text data described above using the image title rule described above with reference to image title dictionary 6 having the content shown in FIG. 3. As a result, if image data including an image title of the same category pattern as that stored in document structure memory 7 is detected, the image data is identified as one to be inserted at key information position P. FIG. 6 shows this processing flow. More specifically, image data is read out from image data memory 3 (step 21). A sentence until a period or a carriage return is extracted (step 22). It is checked if the extracted sentence coincides with the content of image title dictionary 6 (step 23). Matching processing (step 24) for determining whether or not the category pattern of the sentence coincides with any of the image title rules, and matching processing (step 25) for determining whether or not the category pattern of the image title extracted from the image data coincides with the category pattern of the image title extracted from the text data, are sequentially performed. As a result of these matching processing operations, if a coincidence is found, the corresponding image data is transferred to image size identifying section 9 (steps 26 and 27).

Image size identifying section 9 identifies the size of the image data. The size of the image data is, for example, a portion indicated by a broken line in FIG. 5, and the size information is stored in image data memory 3 to be paired with the image data. Document processing controller 13 writes the identified image size at key information position PO indicated by the sentence number in document structure memory 7.

When the relation between the image title in the text data and the image data, an its image size are extracted, open & layout controller 10 develops the text data ned image data in document data of a printing image. The text data is sequentially read out from the beginning of the sentence, and is laid out in the printing image as shown in any one of FIGS. 7A to 7H. Note that FIGS. 7A to 7H illustrate examples wherein data is developed in two columns per page. The structural attribute of each sentence in document structure memory 7 is then referred. When a Pth sentence is read, it can be detected that the structure attribution of the sentence is an image title. In this case, the size of the image data is checked, and the image layout rule is read out from image layout rule memory 11 to check a layout position. Image layout rules stored in image layout rule memory 11 are as follows.

Image Layout Rule

[Rule 1]

Condition 1. An X-size of an image region exceeds an X-size of a text frame.

Condition 1.1. Key information of image data is located in a lower half in the Y direction of the test frame.

oResult] The image region is arranged at the lowermost position of the frame.

Condition 1.2. Key information of image data is located in an upper half in the Y direction of the text frame.

Condition 1.2.1. A frame has a plurality of columns, and a blank frame is present to the right of the corresponding frame.

[Result] The image region is arranged at the uppermost position of the right blank frame.

Condition 1.2.2. A frame has one or a plurality of columns, and there is no blank frame to the right of the corresponding frame.

[Result] The image region is arranged at the uppermost position of the starting frame in the next page.

Condition 2. An X-size of an image region is equal to or smaller than an X-size of the text frame.

condition 2.1. Y-size yn of image data is equal to or smaller than size yf of the remaining portion of the corresponding frame.

[Result] The image region is arranged below a sentence of sentence number P-1.

Condition 2.2. Y-size yn of image data is larger than size yf of the remaining portion of the corresponding frame.

Condition 2.2.1. A frame has a plurality of columns, and a blank frame is present to the right of the corresponding frame.

[Result] The image region is arranged at the uppermost position o the right blank frame.

Condition 2.2.2. A frame has one or a plurality of columns, and there is no blank frame to the right of the corresponding frame.

[Result] The image region is arranged at the uppermost position of the starting frame in the next page.

Condition 3. Y-size yn of image data is larger than Y-size yf of a frame or Y-size yp of a page.

[Result] - and X-sizes of the image region are reduced to (yf/yn) or (yp/yn), and the image region is arranged.

Figure 7A:
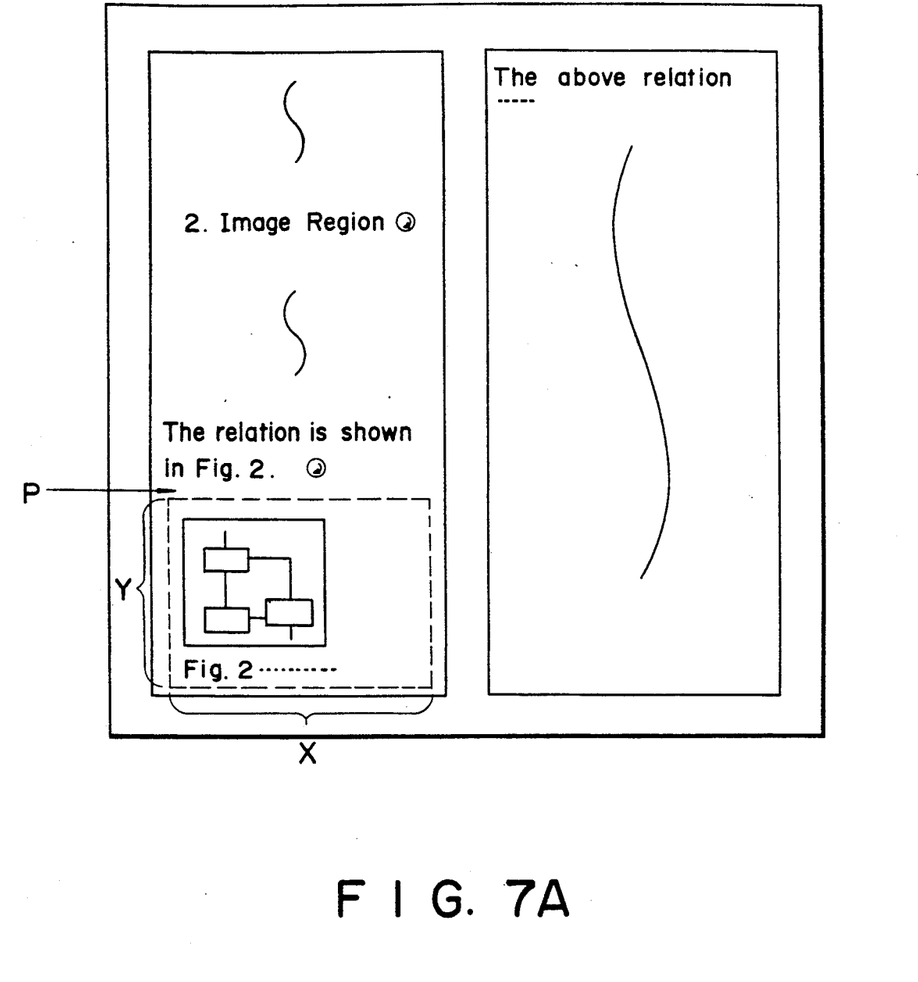
FIGS. 7A to 7H are views for explaining two different printing images of document data consisting of text data and image data in the system shown in FIG. 1.
Figure 7B:
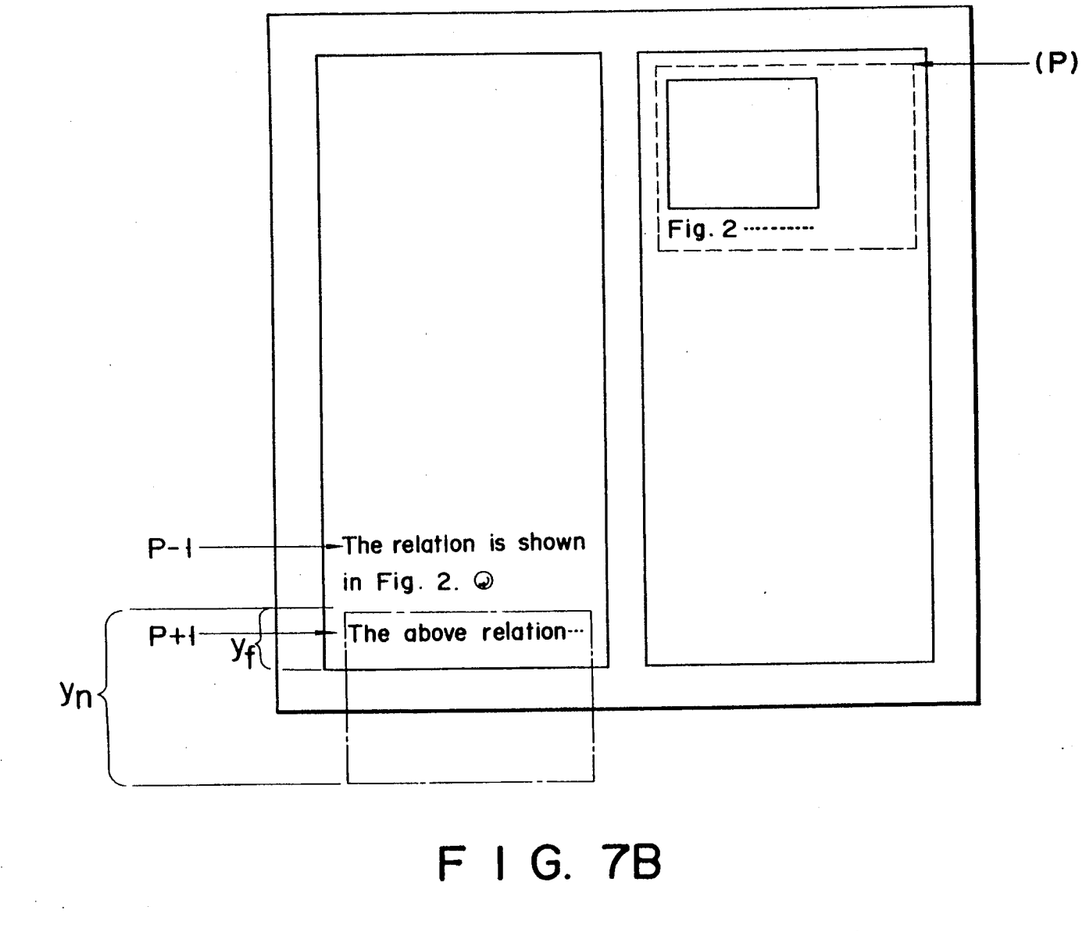

In the case of FIG. 7A, condition 2.1 of rule 1 is applied, and an image region is laid out to the left one of the two columns. If Y-size yn of image data is larger than remaining size yf of the left frame size, as shown in FIG. 7B, image data cannot be inserted, and condition 2.2.1 of rule 2 is applied, and the P+1 sentence is read out and developed after the P−1 sentence but prior to the P sentence. Image data corresponding to an image title of sentence number P is developed in a right frame. More specifically, sentences are reordered, so that an image data region does not extend across two frames. These processing operations are performed by open & layout controller 10. After data is developed in a printed image, the obtained data is output to output section 12.

Figure 7C:
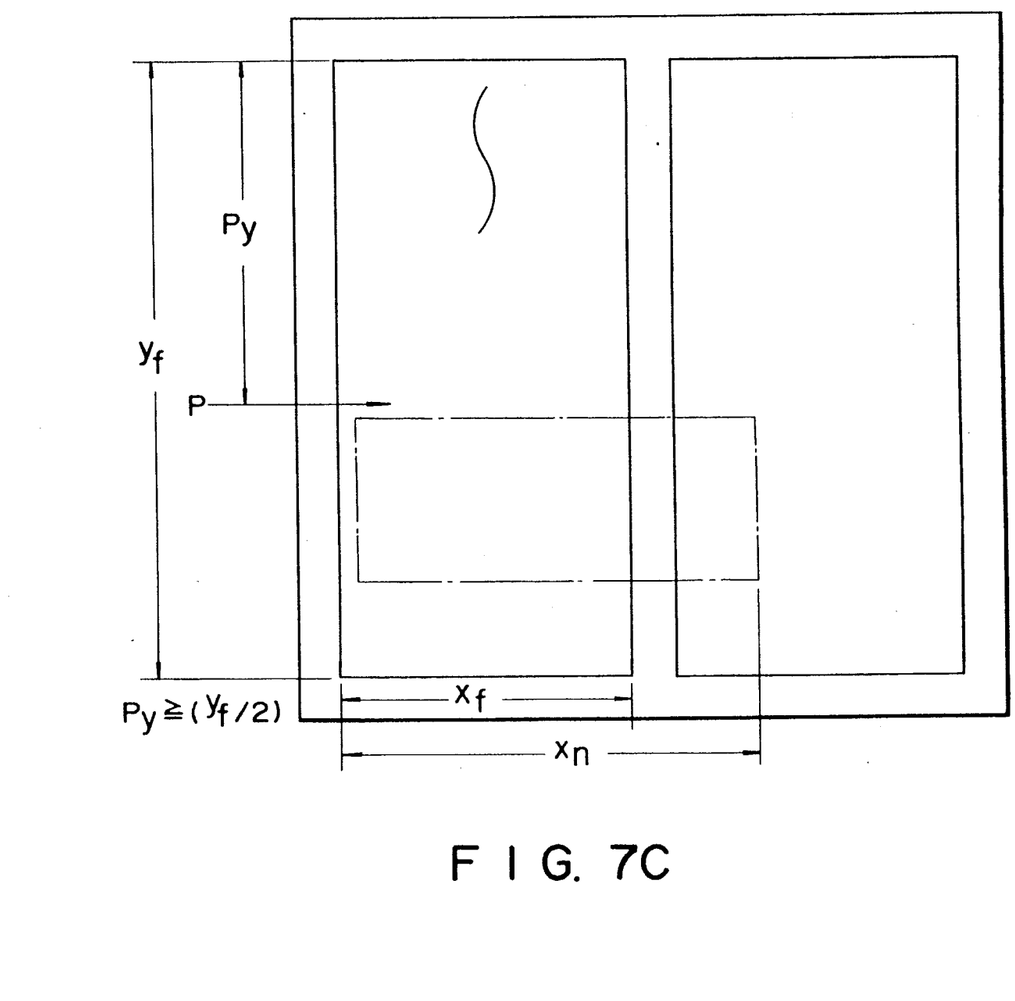
Figure 7D:
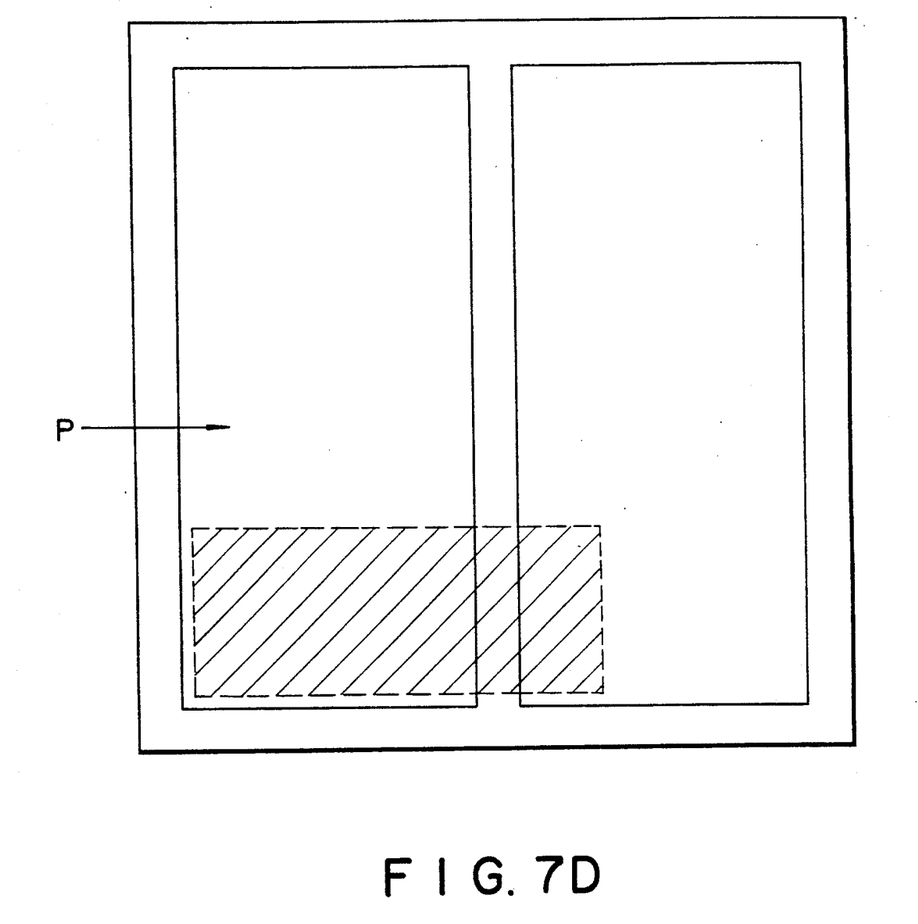

As shown in FIG. 7C, distance py for the upper end of the frame to key information position is larger than a size half Y-size yf of the frame [py≧(yf/2)], condition 1.1. is applied, and an image region is arranged the lowermost position of the frame, as shown in FIG. 7D.

Figure 7E:
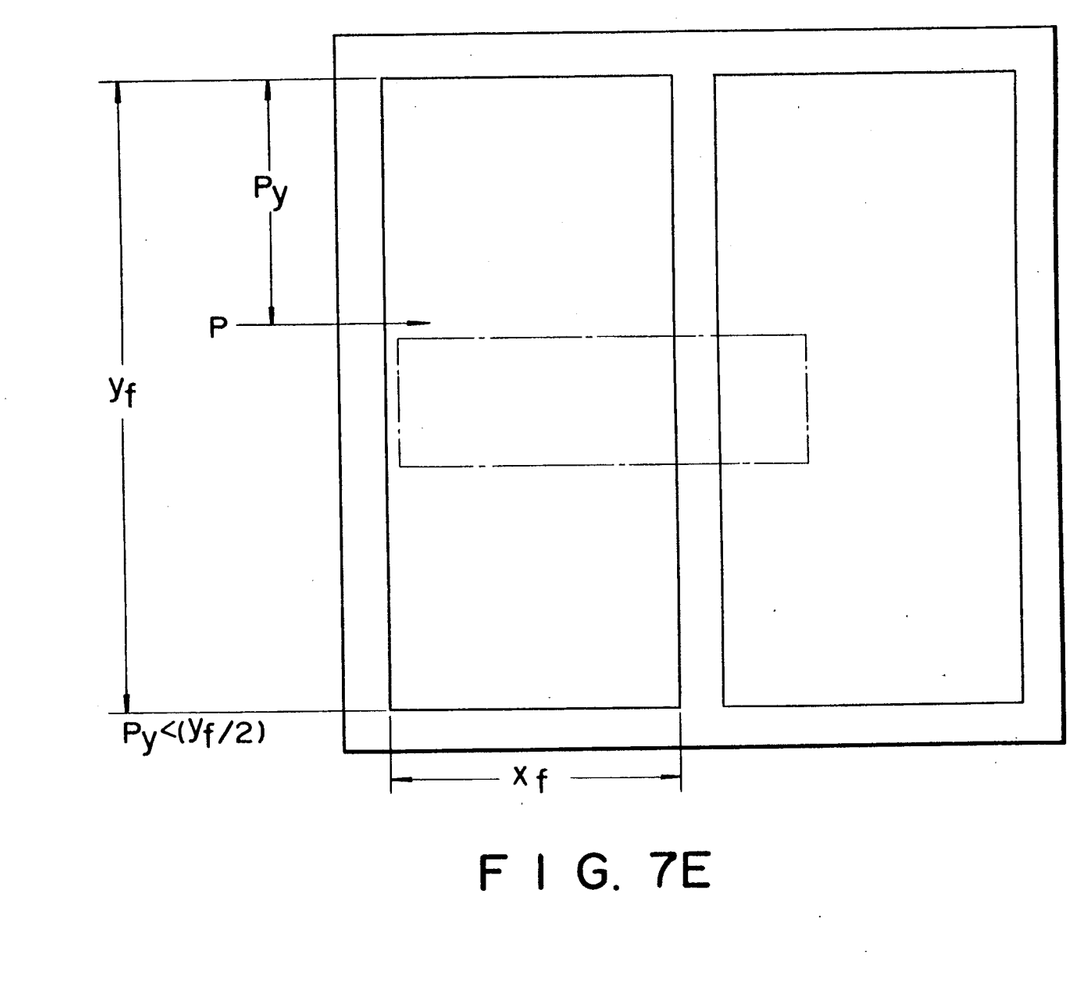
Figure 7F:
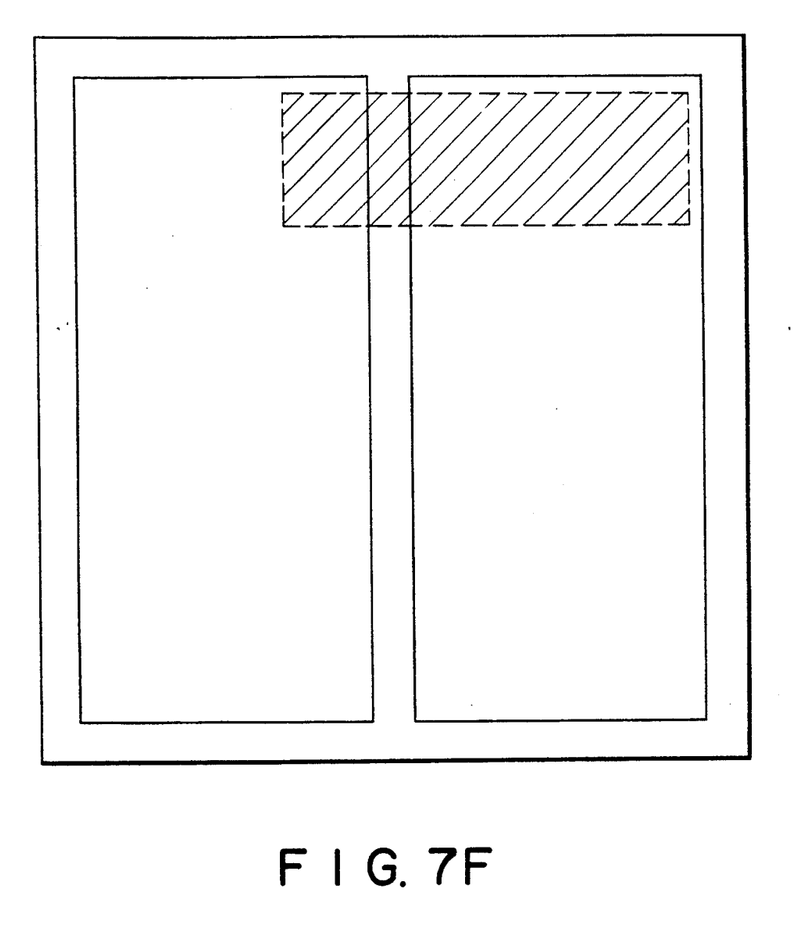

Opposite to FIG. 7C, as shown in FIG. 7E, when distance py from the upper end of the frame to key information position P is smaller than a size half Y-size yf of the frame [py≦(yf/2)], condition 1.2.1. is applied, and an image region is arranged at the uppermost position of the right frame, as shown in FIG. 7F.

Figure 7G:
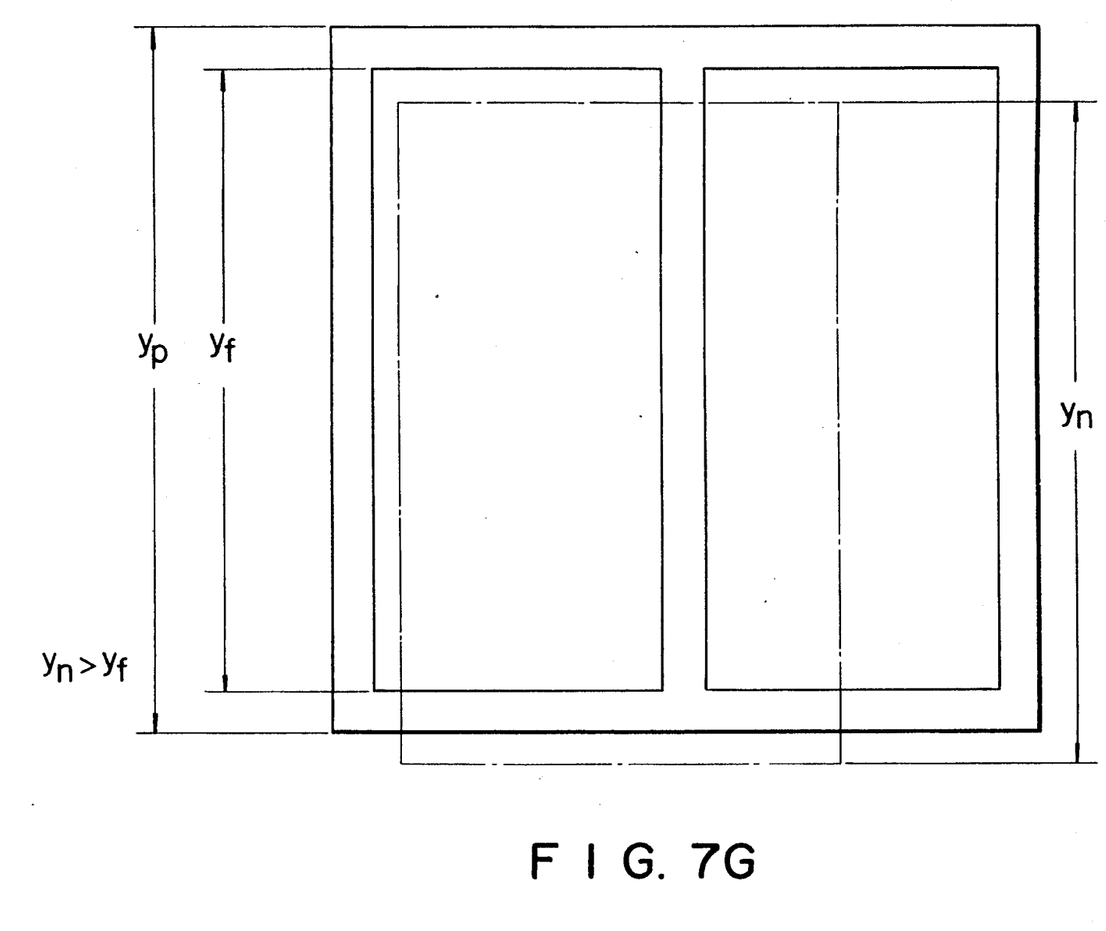
Figure 7H:
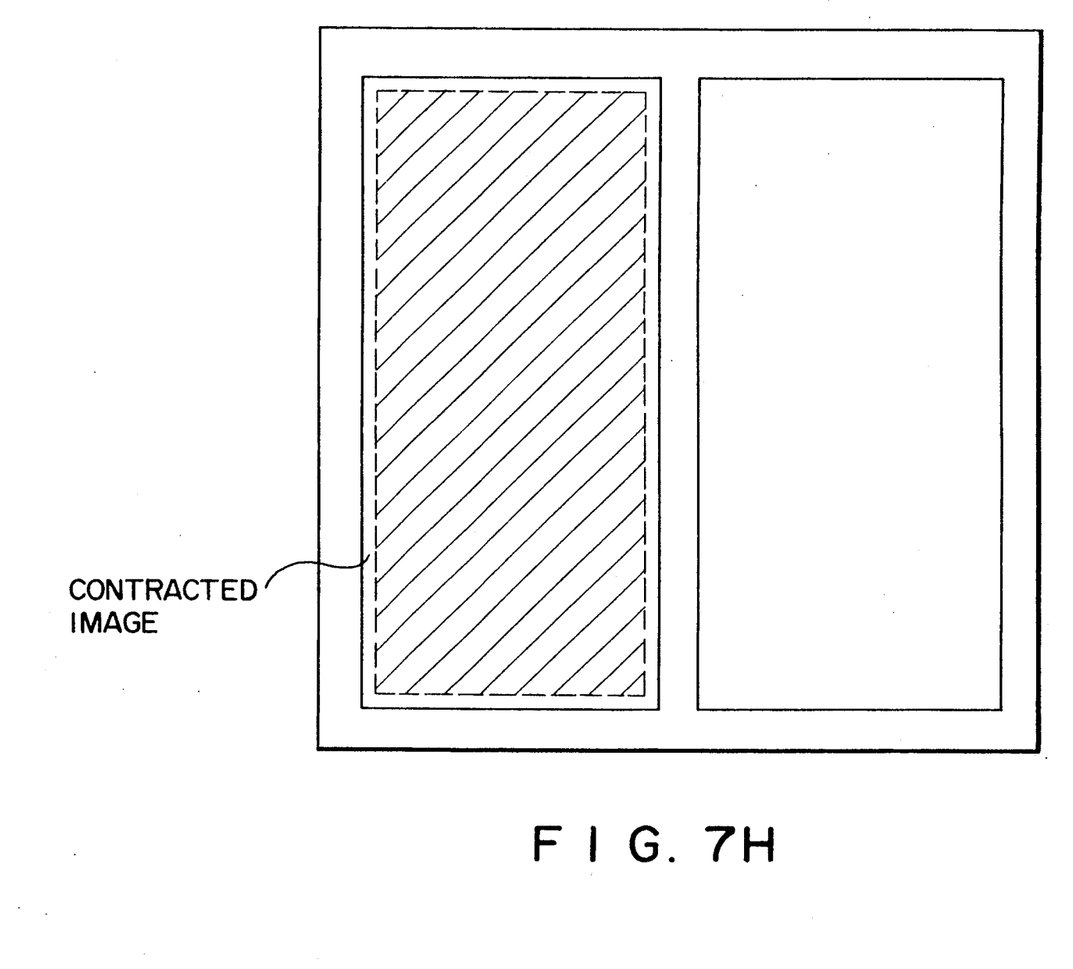

When Y-size yn of the image region exceeds Y-size yf of the frame or Y-size yp of a page, as shown in FIG. 7G, condition 3 is applied, and the image size is reduced to [(yf/yn) or (yp/yn) times] so that the image region falls within the frame, and the reduced image region is arranged in the frame, as shown in FIG. 7G.

As described above, text data nd image data are separately crated, and image data can be merged in text data at a position near the image title described in the text data so that an image data region does not extend across two pages, thus allowing effective document processing.

The present invention is not limited to the above embodiment. In the above embodiment, the same image title as that written in image data is written in text data, and is sued asked information to determine the relation by matching processing. However, matching processing may be performed using only an image classification word and an alphanumeric expression as key information. Thus, an image title itself need not be written in text data. For example, "FIG. 2" is extracted from test data "as shown in FIG. 2", and its insertion position can be identified. At this time, the insertion position of image data may be laid out to an identical a page in which "FIG. 2" is developed, in accordance with a layout rule.

The size of image data is not limited to a size smaller than one page, but may be constituted by one document consisting of a plurality of pages or a plurality of documents. That is, image data need only be identified from document data using a file name or the like. In this case, a file name of image data may be inserted a s background data of text data, i.e., part of control data group corresponding to text data.

Furthermore, the user can alter the image title rule and the image layout rule, and can set new rules in place of the rules described above.

What is claimed is:

1. A document processing system comprising:

input means for entering document data including text data dn image data including image title data titling the image data, the text data selectively including the image title data;

memory means for storing the text data and the image data entered by means of said input means;

text analyzing means for recognizing a position of the image title data in the text data and identifying a position in the document data, at which the image data is to be assigned, from the position of the image title data in the text data;

image identifying means for identifying image data corresponding to the image title data with reference to the image data stored in said memory means;

image size identifying means for identifying an image size of the image data identified by said image identifying means;

layout processing means for laying out an image region o the identified image data, at the position of the image title data in the document data, in accordance with a predetermined layout rule determined by the image size; and output means for outputting the document data including the image region laid out by said layout processing means.

2. A system according to claim 1, wherein said image identifying means includes means for detecting that the image title data included in the image data coincides with the image title data included in the text data to identify image data to be inserted in the document data.

3. A system according to claim 1, wherein the image title data is an image number inserted in the text data, said image data includes an image number and said image identifying means includes means for detecting that the image number included in the image data coincides with the image number included in the text data, to identify image data to be inserted in the document data.

4. A system according to claim 1, wherein the image title data is a file name included in the text data s background data of the text, and said image identifying means comprises means for identifying image data written in a file designated by the file name as image data to be laid out.

5. A system according to claim 1, wherein aid layout processing means comprises means for performing layout control in accordance with a layout rule for controlling a layout position such that an image region does not extend across two pages.

6. A system according to claim 1, wherein said layout processing means includes means for performing layout control in accordance with a layout rule for determining a layout position near the image title data in the text data.

7. A system according to claim 1, wherein said layout processing means includes means for varying the image size before an image region of the identified image data is laid out in the document data.

8. A system according to claim 1, wherein aid layout processing means includes means for altering the layout rule.

9. A document processing system comprising:

input means for entering document data including text data and image data including image title data, the text data selectively including the image title data;

memory means or storing the text data nd the image data entered by means of said input means;

text analyzing means for recognizing a position of the image title data in the text data an identifying a position in the document data, at which the image data is to be assigned, from the position of the image title data in the text data;

image identifying means for identifying image data corresponding to the image title data with reference to the image data stored in said memory means;

image size identifying means for identifying an image size of the image data identified by said image identifying means;

layout processing means for laying out an image region of the identified image data, at the position of the image title data in the document data, in accordance with the the position of the image title data dn the image size identified by said image size identifying means, with reference to a predetermined layout rule; and output means for outputting the document data including the image region laid out by said layout processing means.

10. A system according to claim 9, wherein said image identifying means includes means or detecting that the image title data included in the image data coincides with the image title data included in the text data, to identify image data to be inserted in the document data.

11. A system according to claim 9, wherein the image title data is an image number inserted in the text data, said image data includes an image number , and said image identifying means includes means for detecting that the image number included in the image data coincides with the image number included in the text data, to identify image data to be insetted in the document data.

12. A system according to claim 9, wherein the image title data is a file name included in the text data as background data of the text, and said image identifying means comprises means for identifying image data written in a file designated by the file name as image data to be laid out.

13. A system according to claim 9, wherein said layout processing means comprises means for performing layout control in accordance with a layout rule for controlling a layout position such that an image region does not extend across two pages.

14. A system according to claim 9, wherein said layout processing means includes means for performing layout control in accordance with a layout rule for determining a layout position near the image title data in the text data.

15. A system according to claim 9, wherein said layout processing means includes means for varying the image size before an image region of the identified image data is laid out in the document data.

16. A system according to claim 9, wherein said layout processing means includes means for altering the layout rule.

* * * * *